US006589135B2

(12) United States Patent
Miller

(10) Patent No.: US 6,589,135 B2
(45) Date of Patent: Jul. 8, 2003

(54) SYSTEM AND METHOD FOR REDUCING VEHICLE BOUNCING

(75) Inventor: James Anton Miller, Cedar Falls, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/934,205

(22) Filed: Aug. 21, 2001

(65) Prior Publication Data

US 2003/0040403 A1 Feb. 27, 2003

(51) Int. Cl.[7] .......... B60K 59/74
(52) U.S. Cl. .......... 477/110; 180/197; 123/436
(58) Field of Search .......... 477/110, 111, 477/904; 701/53, 54, 56, 61, 65, 84, 85, 86, 87, 103, 104, 110, 111; 180/197; 123/494, 436, 192.1

(56) References Cited

U.S. PATENT DOCUMENTS 4,345,559 A * 8/1982 Kuttner et al. .......... 123/435
4,527,523 A * 7/1985 Daumer et al. .......... 123/406.24
4,656,986 A * 4/1987 Kull et al. .......... 123/357
4,928,652 A * 5/1990 Shinya et al. .......... 123/406.19
5,136,998 A * 8/1992 Deutsch .......... 123/406.4
5,163,530 A * 11/1992 Nakamura et al. .......... 180/197
5,448,976 A * 9/1995 Treinies et al. .......... 123/406.23
5,470,289 A * 11/1995 Pioch et al. .......... 477/111
5,560,336 A * 10/1996 Takahashi et al. .......... 123/406.24
5,669,354 A * 9/1997 Morris .......... 123/406.24
5,819,866 A 10/1998 Smith et al.
5,906,187 A * 5/1999 Heuer .......... 123/436
6,035,825 A * 3/2000 Worth et al. .......... 123/357
6,035,827 A 3/2000 Heinitz et al. .......... 123/436
6,072,297 A * 6/2000 Xu et al. .......... 318/139
6,161,517 A * 12/2000 Sans .......... 123/295
6,247,449 B1 * 6/2001 Persson .......... 123/192.1
6,314,342 B1 * 11/2001 Kramer et al. .......... 180/197
6,347,275 B1 * 2/2002 Nakano .......... 701/104
6,347,680 B1 * 2/2002 Mianzo et al. .......... 123/350
6,401,853 B1 * 6/2002 Turski et al. .......... 180/197
6,434,466 B1 * 8/2002 Robichaux et al. .......... 701/54
2001/0050072 A1 * 12/2001 Yomogida .......... 123/436

FOREIGN PATENT DOCUMENTS

EP 0 768 455 A2 4/1997
EP 1 022 160 A2 7/2000

OTHER PUBLICATIONS

Firestone Technical Bulletin, "Road Lope—Mechanical Front Wheel Drive Tractors", pp. 1–2, Jul. 1995.

* cited by examiner

*Primary Examiner*—Rodney H. Bonck
*Assistant Examiner*—David D. Le

(57) ABSTRACT

A system and method is described for controlling vehicle bouncing of a vehicle having an engine driving wheels through a transmission having multiple gear ratios. The vehicle has a fuel control unit for supplying a variable amount of fuel to the engine in response to fuel control signals generated by an engine control unit. The method includes generating a control code as a function of a gear ratio of the transmission; sensing vehicle acceleration with an accelerometer mounted on the vehicle and generating an acceleration signal in response to motion of the vehicle. The fuel control signal is generated as a function of the control code, the acceleration signal and a frequency dependent transfer function value. The fuel delivered to the engine is modified as a function of the fuel control signal.

27 Claims, 3 Drawing Sheets

| CONTROL CODE | $T_c$ | $T_{gain}$ | $T_{\%gain}$ |
|---|---|---|---|
| A | 0.02 | 100 | 200% |
| B | 0.02 | 200 | 250% |
| C | 0.02 | 250 | 300% |
| D | 0.02 | 300 | 400% |
| E | 0.03 | 1500 | 300% |
| F | 0.04 | 2000 | 200% |
| G | 0.05 | 3000 | 20% |
| H | 0.07 | 3500 | 15% |
| I | 0.07 | 4000 | 10% |

| TRANSMISSION GEAR | CONTROL CODE |
|---|---|
| 1 | A |
| 2 | A |
| 3 | B |
| 4 | B |
| 5 | C |
| 6 | C |
| 7 | D |
| 8 | D |
| 9 | D |
| 10 | E |
| 11 | E |
| 12 | F |
| 13 | F |
| 14 | G |
| 15 | G |
| 16 | H |
| 17 | I |

| CONTROL CODE | $T_c$ | $T_{gain}$ | $T_{\%gain}$ |
|---|---|---|---|
| A | 0.02 | 100 | 200% |
| B | 0.02 | 200 | 250% |
| C | 0.02 | 250 | 300% |
| D | 0.02 | 300 | 400% |
| E | 0.03 | 1500 | 300% |
| F | 0.04 | 2000 | 200% |
| G | 0.05 | 3000 | 20% |
| H | 0.07 | 3500 | 15% |
| I | 0.07 | 4000 | 10% |

SYSTEM AND METHOD FOR REDUCING VEHICLE BOUNCING

FIELD OF THE INVENTION

This invention relates to a method for controlling an internal combustion engine of a vehicle in order to reduce low frequency bouncing oscillations of the vehicle, which is a phenomenon known as “road lope”.

BACKGROUND OF THE INVENTION

It is known that off-road vehicles, such as agricultural tractors can, when operated on roads in higher gears and at transport speeds, experience a bouncing condition known as “road lope”, wherein the vehicle oscillates with a frequency in the range between 1 and 3 Hz. A similar condition known as “power hop” can result when a vehicle operates off road, at lower gears and at lower speeds. Various methods and designs have been proposed in attempts to solve this problem. For example, European patent application EP 1 022 160, published on Jul. 26, 2000 and assigned to the assignee of this Application, describes a wheel mounting disk which is intended to more accurately center a wheel and tire on a vehicle axle. However, such a wheel mounting disk has not completely eliminated road lope. U.S. Pat. No. 6,035,827, issued Mar. 14, 2000 to Heinitz et al., discloses a system wherein an engine speed signal is fed back to a characteristic function, and wherein an engine fuel quantity signal is operated on by an inverse transmission function to generate a compensated fuel quantity signal. However, the practicality of such a system is doubtful because it is believed to be difficult to extract the needed information from the feed back engine speed signal.

German Published, Non-Prosecuted Patent Application DE 195 37 787 A1 discloses a method for compensating bouncing oscillations. In that reference a signal expressing the wish of the driver is filtered through the use of a transmission element. The parameters of the transmission element, and thus its transmission behavior, are changed as a function of operating parameters while the internal combustion is operating. Furthermore, a subordinate rotational speed control is used for non-steady operation, which leads to a considerable number of application parameters.

SUMMARY OF THE INVENTION

Accordingly, an object of this invention is to provide a method and system for reducing road lope in a vehicle, such as an agricultural tractor.

A further object of the invention is to provide such a method and system which does not require tire adjusting or manipulation.

A further object of the invention is to provide such a method and system which does not require extracting information from an engine speed sensor.

These and other objects are achieved by the present invention, which is a method and system for controlling road lope in a vehicle having an engine driving wheels through a transmission having multiple gear ratios, and having a fuel control unit for supplying a variable amount of fuel to the engine in response to fuel control signals generated by an engine control unit. The method includes sensing vehicle acceleration with an accelerometer mounted on the vehicle and generating an acceleration signal in response to motion of the vehicle, generating time constant and torque gain values as a function of the transmission gear, generating an output torque value as a function of the acceleration signal, an engine torque, the time constant and the torque gain, and modifying fuel delivered to the engine as a function of the output torque value.

DESCRIPTION OF THE PREFERRED EMBODIMENT

Figure 1:
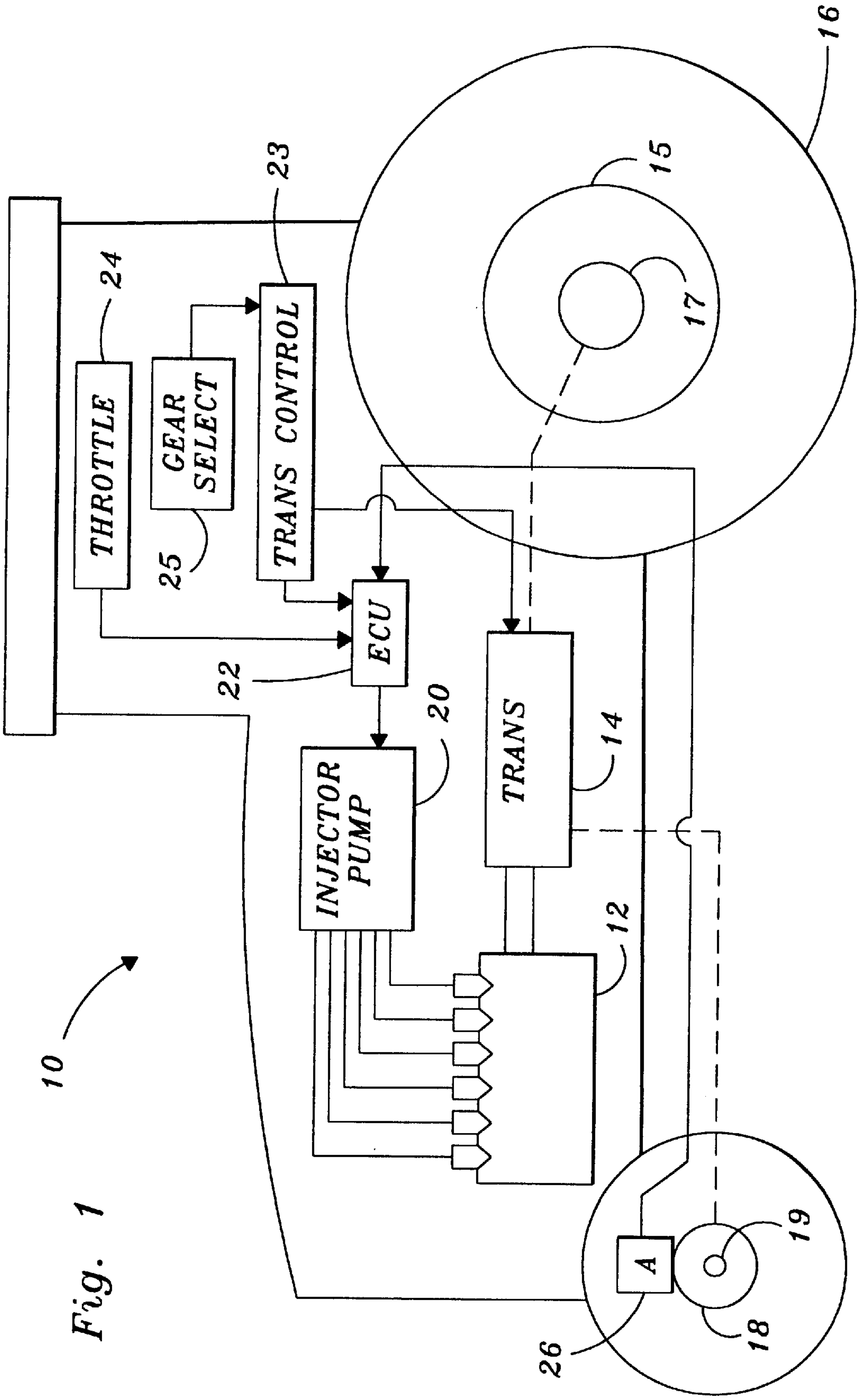
FIG. 1 is a simplified schematic block diagram of the present invention.

In FIG. 1, a vehicle 10, such as a agricultural tractor, includes an engine 12 which supplies power to a transmission 14 which has multiple gear ratios, such as a production powershift transmission. The transmission 14 drives wheels 15, (including tires 16) mounted on an axle 17, and selectively drives front wheels 18 mounted on a front axle 19. Engine control unit (ECU) 22, which includes an electronic governor (not shown), controls pump 20 which supplies a variable amount of fuel to the engine 12 in response to fuel control signals generated by the ECU 22. The ECU 22, in addition to other signals it normally receives, such as a throttle signal from a conventional throttle control or speed command 24, also receives an acceleration signal, such as a variable magnitude analog voltage, from an accelerometer 26. The accelerometer 26 is preferably mounted on or near the front axle 19 so that it generates an acceleration signal representing an acceleration of the portion of the tractor 10 supported above the axle 19. An additional accelerometer (not shown) could be mounted on the rear axle 17. A transmission control unit 23 controls the transmission 14, is coupled to the ECU 22, and receives a gear select signal from a gear select unit 25, such as such as described in U.S. Pat. No. 5,406,860.

The accelerometer 26 generates an analog voltage which will vary from a minimum voltage which represents a maximum downward acceleration to a maximum voltage which represents a maximum upward acceleration. The acceleration signal will also typically be a time varying or oscillating signal with a frequency normally ranging from approximately 1.5 to approximately 3 Hz, depending on speed, weight, tire pressure, and upon whether and what implement (not shown) may be attached to the tractor 10.

Figures 2, 4, 5:
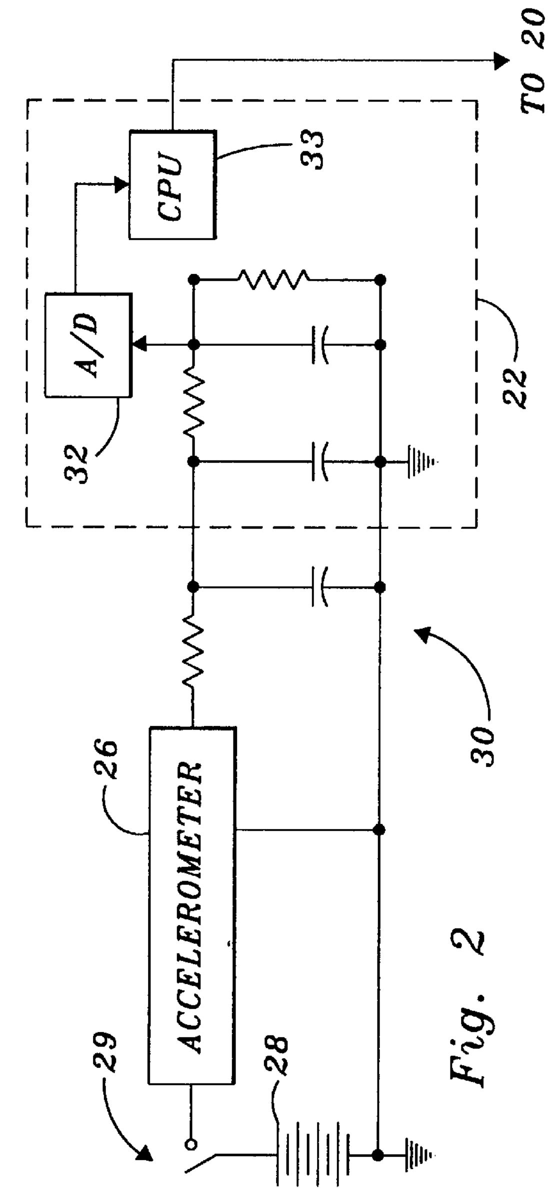
FIG. 2 is a circuit diagram of a circuit which connects an accelerometer to an A/D converter of the ECU of FIG. 1.
FIGS. 4 and 5 are tables of values which may be used in connection with the flow chart of FIG. 3.

Referring now to FIG. 2, the accelerometer 26 is coupled to the vehicle battery 28 via switch 29 and to an A/D converter 32 of the ECU 22 via a low pass filter 34 which includes a resister/capacitor network as illustrated. Preferably, the filtered accelerometer voltage or signal will be a sinusoidal signal which will have an instantaneous value which will vary linearly with respect to sensed acceleration, and will range from a minimum value to a maximum value about a median value representing zero acceleration. The output of the A/D converter 32 is supplied to a microprocessor-based central processing unit (CPU) 33 of the ECU 22.

Figure 3:
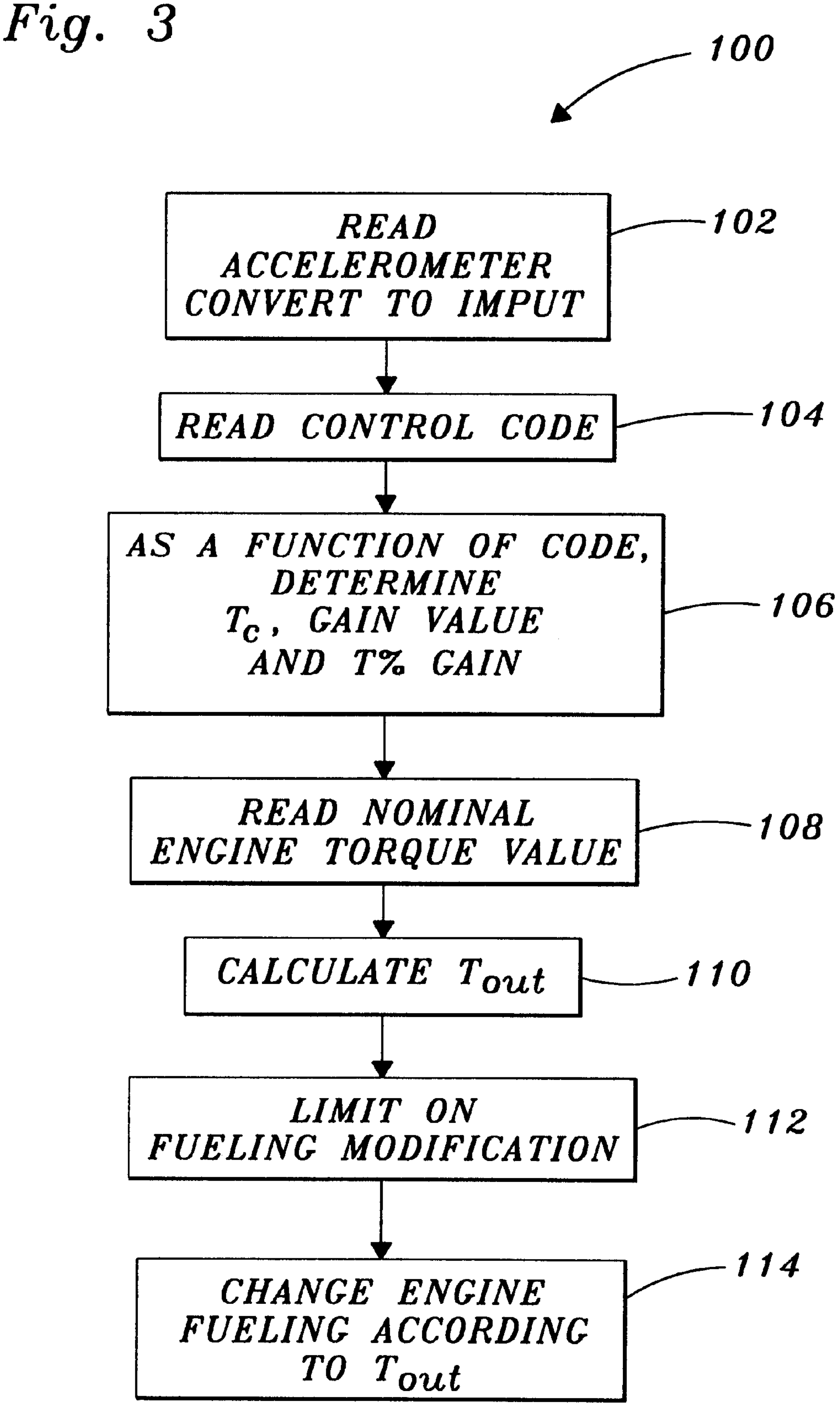
FIG. 3 is a flow chart illustrating an algorithm executed by the ECU of FIG. 1.

Referring now to FIG. 3, the CPU 33 repeatedly executes an algorithm 100. Algorithm 100 begins at step 102 which reads the digitized accelerometer value, A, from the A/D converter 32 and converts it to a percent full scale value, INPUT. Different control code values, CC, corresponding to different transmission gear ratios, are stored in a memory, such as in a lookup table set forth in FIG. 4. Step 104 reads the control code, CC, corresponding to the existing gear ratio of the transmission 14 from the table of FIG. 4. The table of FIG. 4 can be stored in a memory of the transmission controller 23, or it can be stored in a memory of the ECU 22, in which case the ECU 22 would also receive, preferably from the transmission control unit 23, a transmission gear or gear ratio signal which represents the current gear ratio of the transmission 14. In either case, the control code, CC, will vary as a function of the gear ratio of the transmission 14.

Step 106 determines a time constant value, Tc, a torque gain value, Tgain, and a torque percent gain value, T%gain, as a function of the control code, CC, according to the lookup table shown in FIG. 5. It should be understood that if the transmission 14 is in neutral or reverse, that TC, Tgain and T%gain will have a value of zero. Thus, as a result of steps 104 and 106, the time constant value, Tc, the torque gain value, Tgain, and the torque percent gain value, T%gain, are a function of the gear ratio of the transmission 14. As a result of FIGS. 4 and 5, the torque gain value, Tgain, increases as the gear ratio increases, and the torque percent gain value, T%gain, decreases as the gear ratio increases.

Step 108 reads a nominal engine torque value, Te, which may be based upon a mass fuel flow signal from ECU 22.

Step 110 calculates an output torque value, Tout, according to the following equation: Tout=(C−INPUT)×(Tgain+Te×T%gain)/(1+Tc×S), where C is a constant reference value, where 1/(1+Tc×S) is a first order lag term and S is a frequency dependent transfer function operator and (1+Tc×S) is a vector sum term.

As a result, Tout is directly proportional to minus INPUT and to Tgain, Te and T%gain, and is inversely proportional to (1+Tc×S). Also, the output torque value, Tout, will be shifted in phase with respect to the acceleration signal, INPUT, by a phase amount which is a function of a gear ratio of the transmission 14. The magnitude of Tout will also vary as a function of the acceleration signal, INPUT, and of the transmission gear ratio.

Step 112 limits the amount of fueling modification as a function of the capability of the engine 12 and to maintain engine power and prevent engine stalling.

Finally, step 114 generates a modified, limited fuel signal which is supplied to the injection pump 20 so that the engine 12 will receive an amount of fuel which is modified as a function of Tout, and thus is modified as a function of the sensed acceleration and the sensed transmission gear ratio. This modified amount of fuel modifies the power generated by the engine 12 in a manner which counteracts the energy coming from the tires into the tractor chassis which causes the road lope oscillations of the tractor 10, and thus reduces road lope.

The conversion of the above flow chart into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. For example, the road lope control functions could be implemented by algorithms executed by a digital computer or microprocessor as part of an engine control unit. Accordingly, this invention is intended to embrace all such alternatives, modifications and variations which fall within the spirit and scope of the appended claims.

What is claimed is:

1. A method for controlling vehicle bouncing of a vehicle having an engine driving wheels through a transmission having multiple gear ratios, and having a fuel control unit for supplying a variable amount of fuel to the engine in response to fuel control signals generated by an engine control unit, the method comprising:

setting a control code as a function of a gear ratio of the transmission;

sensing vertical vehicle acceleration with an accelerometer mounted on the vehicle and generating an acceleration signal in response to motion of the vehicle;

generating an output signal as a function of the control code and the acceleration signal; and modifying fuel delivered to the engine as a function of the output signal to reduce vehicle bouncing.

2. The method of claim 1, wherein:

the output signal is shifted in phase with respect to the acceleration signal.

3. The method of claim 1, wherein:

the output signal is shifted in phase with respect to the acceleration signal by a phase shift amount which is a function of a gear ratio of the transmission.

4. The method of claim 1, further comprising:

varying a magnitude of the output signal as a function of the acceleration signal and of the transmission gear ratio.

5. The method of claim 1, further comprising:

varying a magnitude and phase of the output signal as a function of the acceleration signal and of the transmission gear ratio.

6. The method of claim 1, further comprising:

generating a time constant value as a function of the control code;

generating a gain value as a function of the control code, and generating the output signal as a function of the time constant value, the gain value and the acceleration signal.

7. The method of claim 1, further comprising:

obtaining an engine torque value representing a torque of the engine;

generating a time constant value as a function of the control code;

generating a gain value as a function of the control code, and generating the output signal as a function of the engine torque value, the time constant value the gain value, and the acceleration signal.

8. The method of claim 1, further comprising:

generating a torque percent gain value as a function of the transmission gear, and generating the output signal as a function of the torque percent gain value and the acceleration signal.

9. The method of claim 1, further comprising:

generating a gain value as a function of the sensed gear ratio;

generating a torque percent gain value as a function of the control code, and generating the output signal as a function of the gain value, the torque percent gain value and the acceleration signal.

10. The method of claim 1, further comprising:

obtaining an engine torque value representing a torque of the engine;

generating a gain value as a function of the control code;

generating a torque percent gain value as a function of the control code, and generating the output signal as a function of the gain value, the torque percent gain value, the engine torque value, and the acceleration signal.

11. The method of claim 1, further comprising:

generating a gain value as a function of the control code, and generating the output signal as a function of the gain value and the acceleration signal.

12. The method of claim 11, wherein:

the gain value increases as the transmission gear ratio increases.

13. A system for controlling vehicle bouncing of a vehicle having an engine driving wheels through a transmission having multiple gear ratios, and having a fuel control unit for supplying a variable amount of fuel to the engine in response to a fuel control signal, the system comprising:

a control code generator for generating a control code as a function of a gear ratio of the transmission;

an accelerometer mounted on the vehicle and generating a vertical acceleration signal in response to motion of the vehicle; and an electronic control unit generating the fuel control signal as a function of the control code and the acceleration signal, and modifying fuel delivered to the engine as a function thereof to reduce vehicle bouncing.

14. The system of claim 13, wherein:

the fuel control signal is shifted in phase with respect to the acceleration signal.

15. The system of claim 13, wherein:

the fuel control signal is shifted in phase with respect to the acceleration signal by a phase shift amount which is a function of the gear ratio of the transmission.

16. The system of claim 13, wherein:

a magnitude of the fuel control signal varies as a function of the acceleration signal and of the transmission gear ratio.

17. The system of claim 13, wherein:

a magnitude and phase of the fuel control signal varies as a function of the acceleration signal and of the transmission gear ratio.

18. The system of claim 13, wherein:

the electronic control unit generates a time constant value as a function of the transmission gear ratio, generates a gain value as a function of the transmission gear ratio, and generates the fuel control signal as a function of the time constant value, the gain value and the acceleration signal.

19. The system of claim 13, wherein:

the electronic control unit obtains an engine torque value representing a torque of the engine, generates a time constant value as a function of the transmission gear ratio, generates a gain value as a function of the transmission gear ratio, and generates the fuel control signal as a function of the engine torque value, the time constant value the gain value, and the acceleration signal.

20. The system of claim 13, wherein:

the electronic control unit generates a torque percent gain value as a function of the transmission gear, and generates the fuel control signal as a function of the torque percent gain value and the acceleration signal.

21. The system of claim 13, wherein:

the electronic control unit generates a gain value as a function of the transmission gear ratio, generates a torque percent gain value as a function of the transmission gear ratio, and generates the fuel control signal as a function of the gain value, the torque percent gain value and the acceleration signal.

22. The system of claim 13, wherein:

the electronic control unit obtains an engine torque value representing a torque of the engine, generates a gain value as a function of the transmission gear ratio, generates a torque percent gain value as a function of the transmission gear ratio, and generates the fuel control signal as a function of the gain value, the torque percent gain value, the engine torque value, and the acceleration signal.

23. The system of claim 13, wherein:

the electronic control unit generates a gain value as a function of the transmission gear ratio, and generates the fuel control signal as a function of the gain value and the acceleration signal.

24. The system of claim 23, wherein:

the gain value increases as the transmission gear ratio increases.

25. A system for controlling bouncing of a vehicle having an engine driving wheels through a transmission having multiple gear ratios, and having a fuel control unit for supplying a variable amount of fuel to the engine in response to fuel control signals generated, the system for controlling bouncing comprising:

a control code generator for generating a control code as a function of a gear ratio of the transmission;

an accelerometer mounted on the vehicle and generating a vertical acceleration signal in response to vertical motion of the vehicle; and an electronic control unit generating a time constant value and a torque gain value as a function of the transmission gear, the electronic control unit also generating the fuel control signal as a function of the acceleration signal, the time constant value and the torque gain value to reduce vehicle bouncing.

26. The system of claim 25, wherein:

the electronic control unit generating the fuel control signal as a function of the acceleration signal, the time constant value, the torque gain value and a frequency dependent transfer function value.

27. A method for controlling vehicle bouncing of a vehicle having an engine driving wheels through a transmission having multiple gear ratios, and having a fuel control unit for supplying a variable amount of fuel to the engine in response to fuel control signals generated by an engine control unit, the method comprising:

generating a control code as a function of a gear ratio of the transmission;

sensing vertical vehicle acceleration with an accelerometer mounted on the vehicle and generating an acceleration signal in response to motion of the vehicle;

generating the fuel control signal as a function of the control code, the acceleration signal and a frequency dependent transfer function value; and modifying fuel delivered to the engine as a function of the fuel control signal to reduce vehicle bouncing.

* * * * *